United States Patent [19]

Kohler

[11] Patent Number: 4,959,759
[45] Date of Patent: Sep. 25, 1990

[54] AUTOMOTIVE INSTRUMENT DISPLAY HAVING A THICKFILM ELECTROLUMINESCENT LIGHTPIPE POINTER

[75] Inventor: James L. Kohler, Kokomo, Ind.

[73] Assignee: Delco Electronics Corporation, Kokomo, Ind.

[21] Appl. No.: 389,446

[22] Filed: Aug. 4, 1989

[51] Int. Cl.⁵ .............................................. B60Q 3/04
[52] U.S. Cl. ...................................... 362/80; 116/288; 116/DIG. 35; 362/26; 362/29; 362/84
[58] Field of Search ....................... 362/23, 26, 29, 30, 362/84, 80, 32; 116/288, DIG. 35, DIG. 36

[56] References Cited

U.S. PATENT DOCUMENTS 4,181,925  1/1980  Burrows et al. .................. 362/84 X
4,559,582  12/1985  Scardilli et al. .................. 362/84 X

OTHER PUBLICATIONS

Instrument Cluster Brochure by VDO Yazaki Corp., pp. 2–9, publication date unknown.

Primary Examiner—Stephen F. Husar
Attorney, Agent, or Firm—Mark A. Navarre

[57] ABSTRACT

A solid state thickfilm electroluminescent lamp illuminates a pointer for viewing automotive instrument clusters during low ambient light conditions. A solid state ThFEL lamp is placed between the faceplate of a vehicle dashboard and the air core mechanism. An instrument cluster pointer is situated on the opposite side of the faceplate from the ThFEL lamp. The ThFEL lamp is donut-shaped with a hole in its center to allow the pointer to connect to the air core mechanism. The lamp has a reflectie electrode and a transparent electrode situated such that the reflective electrode directs the ThFEL light towards the pointer where it is needed and away from the air core mechanism. The pointer is designed to collect a large area of dim light, focusing that light down the pointer shaft and reflecting it to an observer viewing the instrument cluster.

5 Claims, 1 Drawing Sheet

AUTOMOTIVE INSTRUMENT DISPLAY HAVING A THICKFILM ELECTROLUMINESCENT LIGHTPIPE POINTER

This invention relates to a pointer illumination apparatus to facilitate the viewing of automotive instruments during low ambient light conditions.

BACKGROUND OF THE INVENTION

Presently, there are two methods used for illuminating automotive instrument pointers. The first and oldest method involves frontlighting or floodlighting an opaque pointer, typically with an incandescent lightbulb. This method has several shortcomings, however. While it is desirous to design automotive instrument clusters to be as thin as possible to reduce the size of the automobile components and the amount of space required by those components, frontlighting or floodlighting requires depth in the cluster to accommodate the light source. Moreover, frontlighting or floodlighting can create shadows and glare, obscuring the pointer position.

The second method currently in use for illuminating automotive instrument pointers is a lightpipe pointer system. Incandescent lightpiping utilizes a remote incandescent bulb and an acrylic or polycarbonate lightpipe to concentrate the light on the hub of the pointer. The pointer is also made of acrylic or polycarbonate and is designed to direct or "lightpipe" the light from the hub to the viewer. This method has many of the same problems that exist with the frontlighting or floodlighting method of illumination. Moreover, the design, assembly and optimization of a lightpipe system is relatively time consuming and costly.

It has been previously proposed to backlight an instrument pointer with a large surface area thickfilm electroluminescent source, utilizing a light collecting film on the pointer to collect the emitted light. However, electroluminescent light is relatively dim and the pointer illumination is generally unsatisfactory.

SUMMARY OF THE PRESENT INVENTION

The present invention is directed to an improved solid state thickfilm electroluminescent (ThFEL) lamp and lightpipe pointer which overcomes many of the drawbacks associated with current instrument cluster illumination methods. The ThFEL lamp is placed between the instrument faceplate and the pointer drive mechanism, eliminating the supplementary lightpipe utilized in conventional instruments and resulting in reduced thickness of the overall instrument cluster. Also, instead of a large surface area ThFEL source, the present invention utilizes a donut-shaped ThFEL lamp which emits light directly into the pointer hub. In the preferred embodiment of this invention, the donut-shaped lamp contains both a transparent electrode and a reflective electrode to direct substantially all of the emitted light towards the pointer. The pointer "lightpipes" the ThFEL light down the pointer needle without the need for a supplementary lightpipe or a light collecting film, and reflects the light to an observer viewing the instrument cluster Hence, the pointer of the present invention collects a large area of dim light and directs that light up the pointer needle to generate a small, focused area of brighter light.

BRIEF DESCRIPTION OF THE DRAWINGS

The foregoing may be best understood by reference to the following description of a preferred embodiment and the drawings in which.

DESCRIPTION OF THE PREFERRED EMBODIMENT

Figure 1:
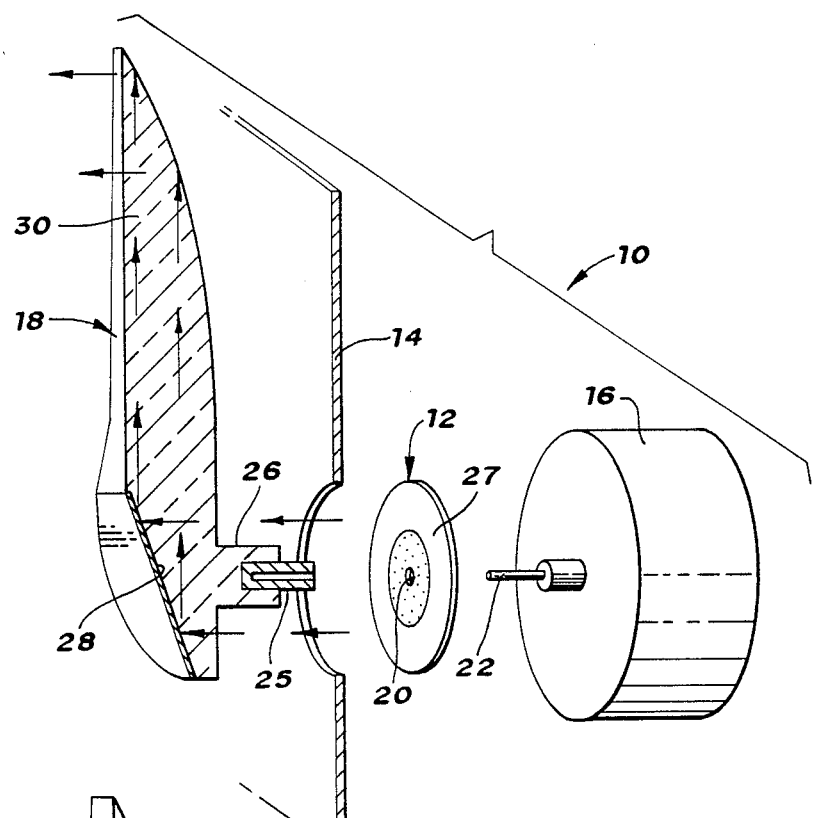
FIG. 1 shows the positioning relationship between the subject invention lightpipe pointer and the ThFEL lamp.

Referring to the drawings, and more particularly to FIG. 1, reference number 10 generally depicts the positioning of the ThFEL lamp with respect to other instrument panel elements. A solid state electroluminescent (EL) lamp 12 is placed between an automotive instrument faceplate 14 and a conventional air core drive mechanism 16. On the side of the faceplate 14 opposite to the EL lamp 12, the pointer 18 is situated. The EL lamp 12 has a hole 20 in its center to allow the spindle 22 of air core mechanism 16 to be attached to the pointer 18 at a stem 25 formed in the hub area 26 of pointer 18. Reference numeral 27 designates the active EL light emitting area.

In one embodiment of the invention, the EL lamp 12 is composed of several layers of material including a reflective electrode and a transparent electrode positioned such that the reflective electrode directs the light emitted by the EL lamp 12 towards the pointer 18 and away from the air core mechanism 16. The pointer 18 is specially designed to transmit this light down the pointer 18 to be reflected to an observer viewing the instrument cluster.

Figure 2:
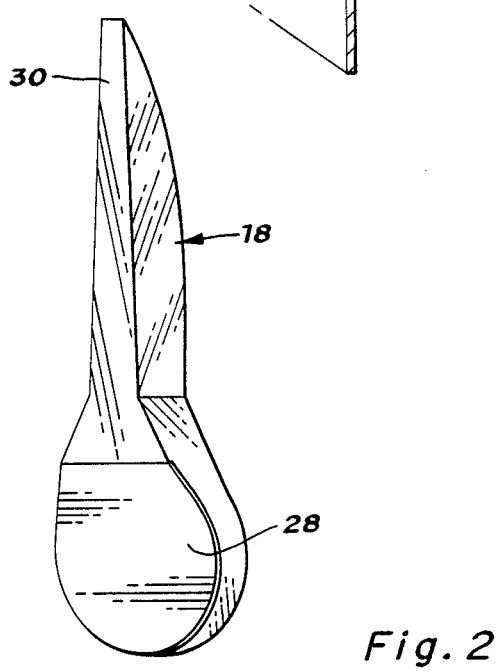
FIG. 2 shows a perspective view of the lightpipe pointer of FIG. 1.

As best seen in FIG. 2, a mirrored surface 28 is formed on on interior surface of the pointer 18 opposite the EL lamp 12. The surface 28 collects the large area of dim light emitted by the EL lamp 12, and causes the EL light to be directed up the pointer 18 where it is reflected outward to an observer viewing the instrument cluster. In this manner, the light emitted from EL lamp 12 is "lightpiped" up the pointer needle 30 without the need for an additional connecting lightpipe or light collecting film. Hence, the pointer 18 collects the EL light and directs that light up the pointer shaft to define a small, focused area of brighter light.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. Apparatus for the illumination of a vehicle instrument pointer during low ambient light conditions, comprising:

a thickfilm electroluminescent lamp emitting an area of relatively dim light, the lamp having a first side and a second side;

a pointer disposed on the first side of the electroluminescent lamp, the pointer including an internal mirrored surface for collecting the light emitted by the electroluminescent lamp and directing such light through the pointer to be reflected toward an observer of the instrument; and a pointer driver mechanism disposed on the second side of the electroluminescent lamp and attached to the lamp and the pointer.

2. Apparatus for the illumination of a vehicle instrument pointer during low ambient light conditions, comprising:

a thickfilm electroluminescent lamp for emitting electroluminescent light;

an electroluminescent lightpipe pointer for reflecting the emitted electroluminescent light toward an instrument observer, the pointer having a hub area aligned with said lamp and a needle area adapted for selective alignment with instrument indicia; and reflective means formed on an internal surface of the pointer hub area pointer opposite said lamp for collecting the electroluminescent light and directing it through the needle area of the pointer for reflection toward said observer.

3. The apparatus set forth in claim 2, wherein:

the pointer hub area includes a stem adapted to be connected to a rotary drive mechanism for controlling the alignment of said needle, such stem extending through a central opening in said electroluminescent lamp such that said lamp is adjacent said hub area.

4. Apparatus for the illumination of a vehicle instrument pointer during low ambient light conditions, comprising:

thickfilm electroluminescent lamp means including an electroluminescent lamp having a reflective electrode formed on one surface thereof and a transparent electrode formed on the other surface thereof such that electroluminescent light emitted from said lamp is directed in substantial entirety through said transparent electrode;

an electroluminescent lightpipe pointer having a hub area aligned with the transparent electrode of said lamp and a needle area adapted for selective alignment with instrument indicia; and reflective means formed on an internal surface of the pointer hub area pointer opposite said lamp for collecting the electroluminescent light emitted from said lamp and directing it through the needle area of the pointer for reflection toward an instrument observer.

5. The apparatus set forth in claim 4, wherein:

the pointer hub area includes a stem adapted to be connected to a rotary drive mechanism for controlling the alignment of said needle, such stem extending through a central opening in said electroluminescent lamp such that the transparent electrode of said lamp is adjacent said hub area.

* * * * *